United States Patent [19]

Tsukimoto et al.

[11] Patent Number: 4,763,148
[45] Date of Patent: Aug. 9, 1988

[54] VIBRATION WAVE MOTOR

[75] Inventors: Takayuki Tsukimoto, Fujisawa; Ichiro Okumura, Yokohama; Takuo Okuno, Yokohama; Kazuhiro Izukawa, Yokohama, all of Japan

[73] Assignee: Canon Kabushiki Kaisha, Tokyo, Japan

[21] Appl. No.: 44,289

[22] Filed: Apr. 30, 1987

[30] Foreign Application Priority Data

May 9, 1986 [JP] Japan ................................ 61-106437

[51] Int. Cl.$^4$ .......................... G03B 3/00; H01L 41/08
[52] U.S. Cl. .................................. 354/195.1; 310/323; 310/328
[58] Field of Search ...................... 354/400, 402, 195.1, 354/195.12; 310/323, 328

[56] References Cited

U.S. PATENT DOCUMENTS

| | | | |
|---|---|---|---|
| 4,484,099 | 11/1984 | Kawai et al. | 310/328 |
| 4,495,432 | 1/1985 | Katsuma et al. | 340/328 |
| 4,504,760 | 3/1985 | Yamamoto et al. | 310/323 |
| 4,513,219 | 4/1985 | Katsuma et al. | 310/328 |
| 4,560,263 | 12/1985 | Katsuma et al. | 354/195.1 |
| 4,580,073 | 4/1986 | Okumura et al. | 310/323 |
| 4,634,915 | 1/1987 | Mukohjima et al. | 310/323 |
| 4,645,964 | 2/1987 | Hiramatsu et al. | 310/323 |
| 4,649,311 | 3/1987 | Mukohjima | 310/323 |
| 4,658,172 | 4/1987 | Izukawa | 310/323 |

*Primary Examiner*—Russell E. Adams
*Attorney, Agent, or Firm*—Fitzpatrick, Cella, Harper and Scinto

[57] ABSTRACT

A vibration wave motor has a circular vibration member for generating a travelling vibration wave in response to application of a periodic voltage to phase-differentially arranged or polarized electro-mechanical energy transducers. A movable member is frictionally driven by the travelling vibration wave. A ring-shaped circular vibration absorption member is provided for absorbing vibration of the vibration member. The vibration absorption member has an outer diameter smaller than an outer diameter of the vibration member so as not to absorb energy at the outer circumference of the vibration member.

8 Claims, 4 Drawing Sheets

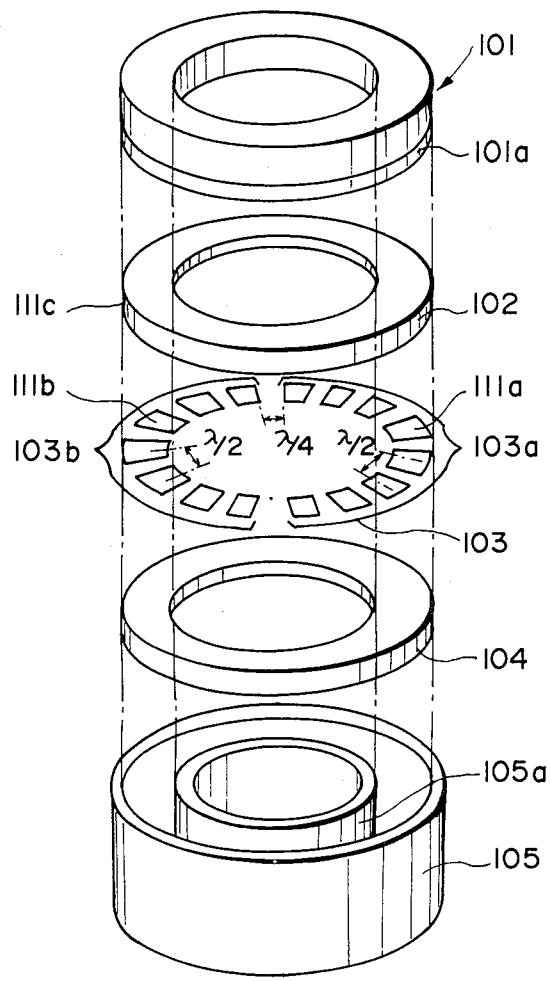
F I G. 1

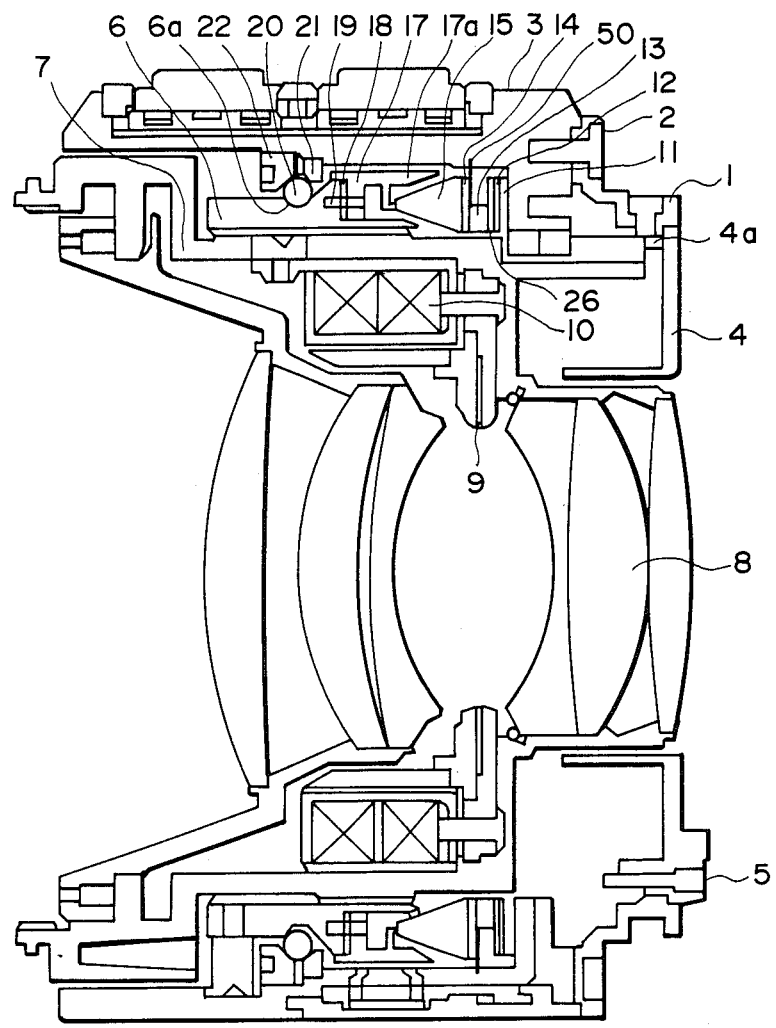
F I G. 2

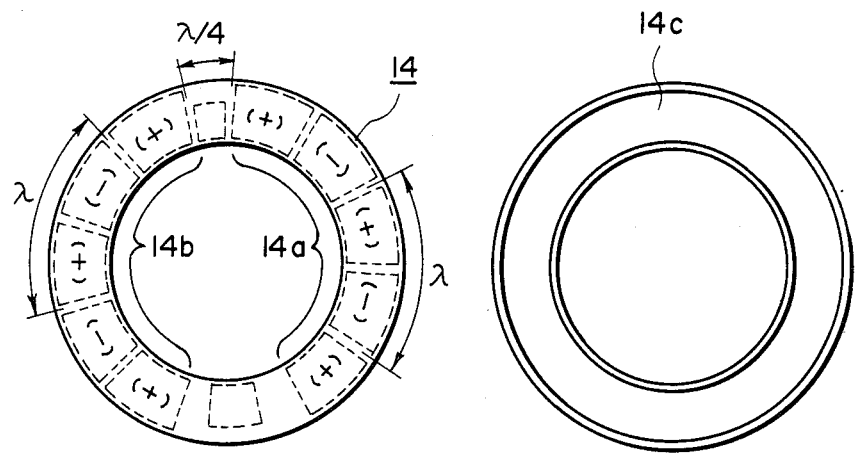
F I G. 3A        F I G. 3B
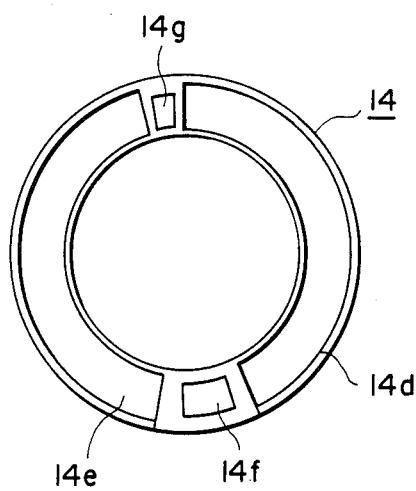
F I G. 3C

VIBRATION WAVE MOTOR

BACKGROUND OF THE INVENTION

1. Field of the Invention

The present invention relates to a vibration wave motor which drives a movable member by a travelling vibration wave on a vibration member, and more particularly to a structure of a vibration absorption member thereof.

2. Related Background Art

A known example of a vibration wave motor which drives a movable member by a travelling vibration wave is explained with reference to FIG. 1, which shows an exploded view of elements of a vibration wave motor. A vibration absorption member 104, a metal ring-shaped vibration member 102 having electrostrictive elements 103 which serve as electro-mechanical transducers bonded on a surface thereof facing the absorption member 104, and a movable member 101 are fitted, in this order, in a center cylinder 105a of a base fixed member 105. The fixed member 105, absorption member 104, electrostrictive elements 103 and vibration member 102 are arranged not to permit mutual rotation. The movable member 101 is press-contacted to the vibration member 102 by its weight or biasing means (not shown) to maintain the integrity of the motor structure.

A group of electrostrictive elements 103a which form a phase A which is one of the vibration phases arranged at a pitch of one-half of a wavelength $\lambda$ of the vibration wave, and a group of electrostrictive elements 103b which form another phase B are also arranged at a pitch of $\lambda/2$. The electrostrictive elements 103a (or 103b) may be a single element instead of a plurlity of elements and the single element may be polarized at the above pitch. The electrostrictive elements 103a and 103b are arranged to have a phase difference of $(n_o+\frac{1}{4})\lambda$ (where $n_o=0, 1, 2, 3,...$). A lead wire is connected to each electrostrictive element 103a on the side facing the absorption member 104, a lead wire 111b is connected to each electrostrictive element 103b, and those lead wires are connected to an A.C. power supply (not shown) and a 90° phase shifter (not shown). A lead wire 111c is connected to the metal vibration member 102 and also to the A.C. power supply.

A friction area 101a of the vibration member 101 is made of hardened rubber to enhance a friction force and reduce abrasion, and it is press-contacted to the vibration member 102.

In the vibration wave motor thus constructed, when an A.C. voltage $V_o \cdot \sin wt$ is applied to one group of electrostrictive elements and an A.C. voltage $V_o \cdot \cos wt$ is applied to the other group of electrostrictive elements, the A.C. voltages which are of opposite polarities between adjacent electrostrictive elements and have a phase difference of 90° between the groups are applied to the respective electrostrictive elements and they vibrate. The vibration is propagated so that the vibration member 102 makes a bending vibration in accordance with the pitch arrangement of the electrostrictive elements 103. When the vibration member projects at every other position corresponding to the electrostrictive element, it retracts at another group of every other position. Since one group of the electrostrictive elements are arranged with $\frac{1}{4}/\lambda$ shift with respect to the other group of the electrostrictive elements, the bending vibration travels. While the A.C voltage is applied, the vibration is sequentially excited and it travels over the vibration member 102 as the travelling bending vibration wave.

In such a vibration wave motor, the lead wire through which the voltage is applied to the electrostrictive element 103 is directly soldered to the electrostrictive element 103. Accordingly its mass productivity is low and the solder may be readily peeled off due to the vibration. Depending on the amount of solder deposited, the vibration frequency changes, and the electrostrictive elements are deteriorated by the heat of soldering. In the Japanese Laid-Open Patent Application No. 96883/1984, it is disclosed that an electrical conductive rubber is used as not only a vibration absorbing member but also an electric power supply member for supplying the power to the electro-strictive element group. However, in the disclosed technique, the diameter of the ring-shaped vibration absorption member is equal to or larger than the diameter of the ring-shaped vibration member or electrostrictive elements. In this construction, the vibration of the vibration member which drives the movable member is not efficiently transmitted to the movable member 102.

When the vibration member is ring-shaped, the vibration amplitude of the travelling vibration wave generated on the vibration member tends to be larger on an outer diameter than on an inner diameter, and when the vibration absorption member having the same diameter as the vibration member is used, the large vibration generated on the outer diameter is absorbed. Thus, the vibration which efficiently drives the movable member is absorbed by the vibration absorption member and the drive efficiency is lowered.

SUMMARY OF THE INVENTION

It is an object of the present invention to provide a vibration wave motor having low energy loss and high driving efficiency.

It is a second object of the present invention to provide a vibration wave motor having a low energy loss, high driving efficiency and high mass productivity.

In order to achieve the first object, in the present vibration wave motor, the outer diameter of the vibration absorption member is smaller than the outer diameter of the circular vibration member.

In order to achieve the second object, in the present vibration wave motor, the circular vibration absorption member is shared with a feeding member, and the outer diameter of the vibration absorption member is smaller than the outer diameter of the circular vibration member.

BRIEF DESCRIPTION OF THE DRAWINGS

FIG. 1 shows a structure of a prior art vibration wave motor,

FIG. 2 shows a sectional view of a single-lens reflex type camera having a vibration wave motor of the present invention mounted thereon, Figs. 3A, 3B and 3C show electrode structures of an electrostrictive element.

DETAILED DESCRIPTION OF THE PREFERRED EMBODIMENTS

Figure 4:
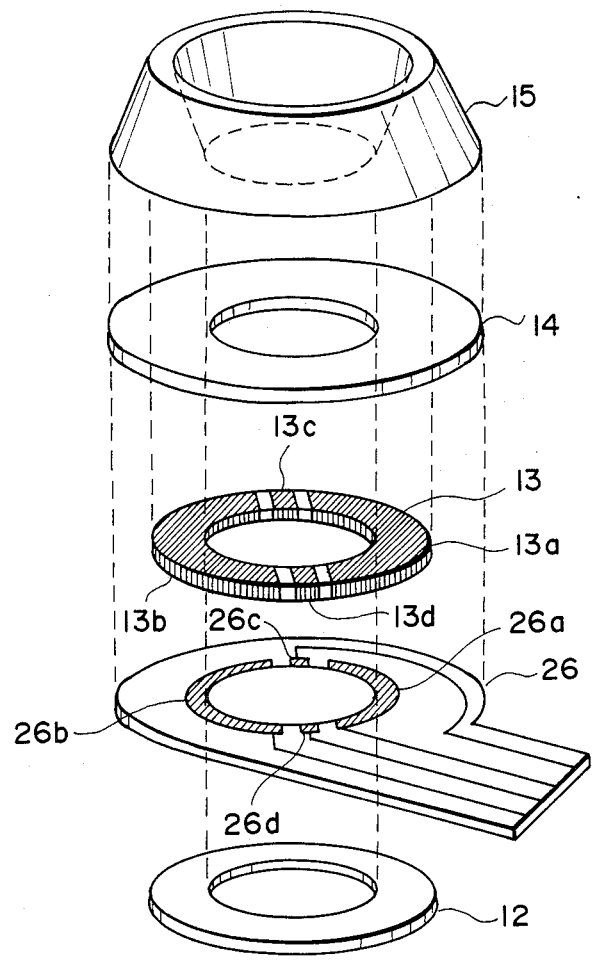
FIG. 4 shows an exploded view of the vibration wave motor of the present invention.

In an embodiment of the present invention, a single-lens reflex type camera exchange lens having a vibration wave motor mounted therein is explained. The electro-mechanical energy transducer means electrostrictive element, piezo element or magnetostrictive element, which is hereinafter referred to as electrostrictive element.

FIG. 2 shows an embodiment of the present invention in which a vibration wave motor is applied to a single-lens reflex type camera exchange lens. Numeral 1 denotes a lens mount attached to a camera body (not shown), numeral 2 denotes a screw, and numeral 3 denotes a fixed bodytube integrally coupled to the mount 1 by the screw 2. Numeral 4 denotes a rear cover which is resiliently coupled to the mount 1 on the side facing the fixed bodytube 3 by a resilient member 4a. Numeral 5 denotes a plurality of contacts through which signals are exchanged with the camera body.

Numeral 6 denotes a rotary tube having a rotary helicoid thread rotated by a vibration wave motor, and numeral 7 denotes a linear tube threadedly engaged with the rotary helicoid screw.

When the rotary tube 6 is rotated by the vibration wave motor, a lens 8 in the linear tube 7 is linearly moved to focus an image. The linear tube 7 also has an iris unit 9 which is linearly moved with the lens 8. Numeral 10 denotes a coil of a motor which drives iris vanes of the iris unit 9. A detail thereof is not explained because it is not pertinent to the present invention.

Numeral 11 denotes a dish spring which is inserted into the fixed bodytube 3. A washer 12 and a vibration absorption member 13 made of felt are overlaid on the dish spring, and a plurality of electrostrictive elements 14 are arranged phase-differentially on the surface facing the vibration absorption member 13 or a phase-differentially polarized electrostrictive element 14 is bonded to a ring-shaped vibration member 15 having a pedestal sectional shape. A voltage is applied to the electrostrictive elements 14 from a power supply (not shown) to generate a travelling vibration waveform in the vibration member 15 in a known manner.

A movable member 17 having a flange 17a is coupled to the rotary tube 6 by a pin 19 through a rubber ring so that the rotary tube 6 is rotated with the movable member 17 by the travelling vibration wave generated in the vibration member 15. The rotary tube 6 has a V-groove 6a and supported by a ball bearing 21 having a plurality of balls 20 fitted to the fixed bodytube 3 and a ball retainer threadedly engaged with the fixed bodytube 3 to reduce the frictional resistance of the rotary tube 6 and to smooth the rotation.

The vibration member 15 is press-contacted to the movable member 17 having the flange 17a by biasing along the optical axis by the dish spring 11, and the movable member 17 is frictionally driven by the travelling vibration wave generated by the vibration member 15. Numeral 50 denotes an anti-rotation member for the vibration member 15.

The polarization of the electrostrictive element 14 is explained with reference to FIG. 3. As shown in FIG. 3A, the electrostrictive element 14 has two polarized areas 14a and 14b each polarized into a plurality of regions. The polarized area 14a and 14b are physically spaced by λ/4. Symbols (+) and (−) show that the directions of polarization are different. When a voltage is applied, the (+) region expands and the (−) region contracts. The sum of the length of the (+) region and (−) region corresponds to a wavelength λ determined by an input frequency. The circumference of the electrostrictive element 14 is a natural number multiple of the sum length of the (+) region and (−) region. In FIG. 3, it is 6 times as long as the sum length. FIG. 3B shows a electrode 14c on an upper surface (facing the vibration member) of the electrostrictive elements 14 grounded through the vibration member, and FIG. 3C shows electrode patterns 14d, 14e, 14f and 14g on a lower surface (facing the vibration absorption member) on a lower surface of the electro-strictive elements 14. The electrode 14e is arranged to face the polarized area 14b, the electrode 14f is a sensor electrode for detecting a resonance frequency, and the electrode 14g is connected to the grounded electrode 14c and to the lead wire (not shown) on the lower surface of the electrostrictive elements so that voltages are applied to the polarized area 14a and 14b.

FIG. 4 shows major portions of the vibration wave motor shown in FIG. 2.

The vibration absorption member 13 is made of rubber or felt to prevent mechanical vibration from being propagated to the fixed bodytube 3. If the vibration absorption member 13 is on the entire surface of the bottom of the vibration member 15, the vibration absorption member absorbs energy necessary to efficiently drive the movable member because the vibration amplitude at an outer circumference of the ring-shaped vibration member is larger than that at an inner circumference. Thus, energy is lost. Accordingly, the vibration absorption member 13 is arranged not on the entire surface of the bottom of the electrostrictive elements 14 or the vibration member 15 but on the inner circumference of the bottom of the ring-shaped vibration member 15, as shown in FIG. 4.

The vibration absorption member 13 comprises ring-shaped conductive felt members 13a, 13b, 13c and 13d and a non-conductive felt member.

The electrostrictive element 14 having the electrode structure described above is bonded to the bottom of the vibration member 15 and the conductor of the vibration absorption member 13 is aligned with the electrode structure, and a flexible printed circuit board 26 for feeding power to the electrostrictive element 14 is arranged under the vibration absorption member 13, more particularly, the electrodes 14d, 14e, 14f and 14g of the electrode pattern shown in FIG. 3C face the conductive felt members 13a, 13b, 13c and 13d, respectively, and also faces the conductors 26a, 26b, 26c and 26d of the flexible printed circuit board 26. A washer 12 and a dish spring 11 (see FIG. 2) are arranged under the flexible printed circuit board 26 so that the vibration member 15 is press-contacted to the movable member 17 by the spring force of the dish spring.

With this construction, when the voltages having the phase difference therebetween are applied from the power supplies (not shown) to the electrostrictive elements 14a and 14b, the travelling vibration wave is generated on the vibration member and the movable member which is press-contacted to the vibration member is frictionally driven. Since the vibration absorption member is not arranged on the entire surface of the bottom of the vibration member 15, the energy necessary for drive is not absorbed at its outer circumference and the motor efficiency is significantly improved.

In FIG. 4, the flexible printed circuit board 26 is arranged between the vibration absorption member 13 and the washer 12, although it may be arranged between the electrostrictive elements 14 and the vibration absorption member 13. In this case, the conductors of the flexible printed circuit board 26 are arranged on the side facing the vibration absorption member 13 (lower side).

While a ring-shaped vibration absorption member is shown, it may be oval.

In accordance with the present invention, the vibration absorption member of the vibration wave motor is arranged on the inner circumference of the ring-shaped vibration member so that energy loss is minimized. In the embodiment of the present invention, there is no variation in the standing wave for generating the travelling wave due to the amount of solder for soldering the lead wires and a uniform travelling wave is generated. Further, the mass productivity, stability and durability of the vibration wave motor are improved.

While the present vibration wave motor is mounted in a camera lens drive mechanism, the present invention is not limited to the illustrated embodiment but it may be applied to other drive mechanisms.

We claim:

1. A vibration wave motor comprising:
   a circular vibration member for generating a travelling vibration wave in response to application of a periodic voltage to phase-differentially arranged or polarized electro-mechanical energy transducers, wherein a vibration amplitude of an outer circumferential portion of said vibration member is greater than that of an inner circumferential portion;
   a movable member to be frictionally driven by the travelling vibration wave; and
   a circular vibration absorption member for absorbing vibration of said vibration member;
   said vibration absorption member having an outer diameter smaller than an outer diameter of said vibration member so that said absorption member contacts only the inner circumferential portion of said vibration member.

2. A vibration wave motor comprising:
   a circular vibration member for generating a travelling vibration wave in response to application of a periodic voltage to phase-differentially arranged or polarized electro-mechanical energy transducers, wherein a vibration amplitude of an outer circumferential portion of said vibration member is greater than that of the inner circumferential portion;
   a movable member to be frictionally driven by the travelling vibration wave; and
   a circular vibration absorption member for absorbing vibration of said vibration member;
   said vibration absorption member for absorbing vibration of said vibration member;
   said vibration absorption member having an outer diameter smaller than an outer diameter of said vibration member so that said absorption member contacts only an inner circumferential portion of said vibration member;
   said vibration absorption member serving as a feed member of the periodic voltage to said electro-mechanical energy transducers.

3. A lens barrel for a camera including a vibration wave motor, said vibration wave motor comprising:
   a circular vibration member for generating a travelling vibration wave in response to application of a periodic voltage to phase-differentially arranged or polarized electro-mechanical energy transducers, wherein a vibration amplitude at an outer circumferential portion of said vibration member is greater than a vibration amplitude at an inner circumferential portion;
   a movable member to be frictionally driven by the travelling vibration wave; and
   a circular vibration absorption member for absorbing vibration of said vibration member;
   said vibration absorption member having an outer diameter smaller than an outer diameter of said vibration member so that said absorption member contacts only an inner circumferential portion of said vibration member.

4. A lens bodytube according to claim 3 wherein said vibration absorption member serves as a feed member of the periodic voltage to said electro-mechanical energy transducers.

5. A vibration wave motor according to claim 1, wherein said vibration absorption member is made of felt.

6. A vibration wave motor according to claim 5, wherein said felt includes conductive material.

7. A vibration wave motor comprising:
   an electro-mechanical conversion means;
   a vibration means for generating a travelling vibration wave in response to application of an alternating electrical signal to said electro-mechanical energy conversion member, wherein a vibration amplitude of an outer circumferential portion of said vibration means is greater than that of an inner circumferential portion;
   a movable means to be frictionally driven by the travelling wave; and
   a vibration absorption means for absorbing vibration of said vibration means, said absorption means being provided so as to contact only an inner circumferential portion of said vibration means.

8. A vibration wave motor according to claim 5, wherein said vibration absorption means is made of felt.

* * * * *

UNITED STATES PATENT AND TRADEMARK OFFICE
CERTIFICATE OF CORRECTION

PATENT NO. : 4,763,148
DATED : August 9, 1988
INVENTOR(S) : Takayuki Tsukimoto, et al.

It is certified that error appears in the above-identified patent and that said Letters Patent is hereby corrected as shown below:

COLUMN 1

Line 39, change "lead wire" to --lead wire 111a--.

COLUMN 2

Line 7, change "Accordingly its," to --Accordingly, its--; and

Line 40, delete "a" (second occurrence).

COLUMN 3

Line 45, change "supported" to --is supported--.

COLUMN 4

Line 23, change "efficient" to --efficient- --;

Line 46, change "faces" to --face--; and

Line 61, change "drive" to --driving--.

UNITED STATES PATENT AND TRADEMARK OFFICE
CERTIFICATE OF CORRECTION

PATENT NO. : 4,763,148

DATED : August 9, 1988

INVENTOR(S) : Takayuki Tsukimoto, et al.

It is certified that error appears in the above-identified patent and that said Letters Patent is hereby corrected as shown below:

<u>COLUMN 6</u>

Line 28, change "bodytube" to --barrel--; change "claim 3" to --claim 3,--; and

Line 52, change "claim 5," to --claim 7,--.

Signed and Sealed this

Thirteenth Day of June, 1989

Attest:

DONALD J. QUIGG

*Attesting Officer*    Commissioner of Patents and Trademarks